No. 894,305. PATENTED JULY 28, 1908.
A. H. WOUTERS.
TURBO GENERATOR.
APPLICATION FILED NOV. 3, 1906.
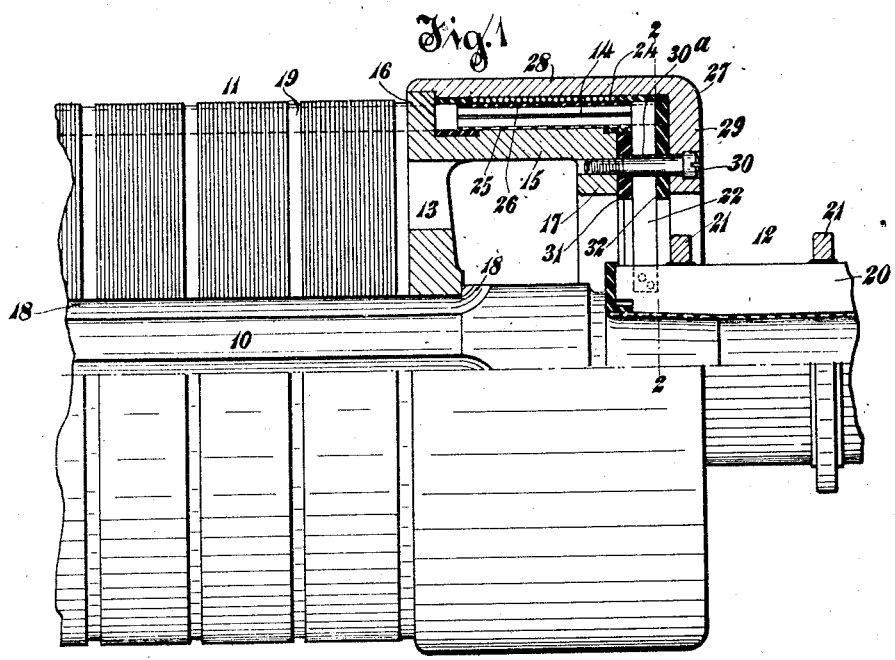
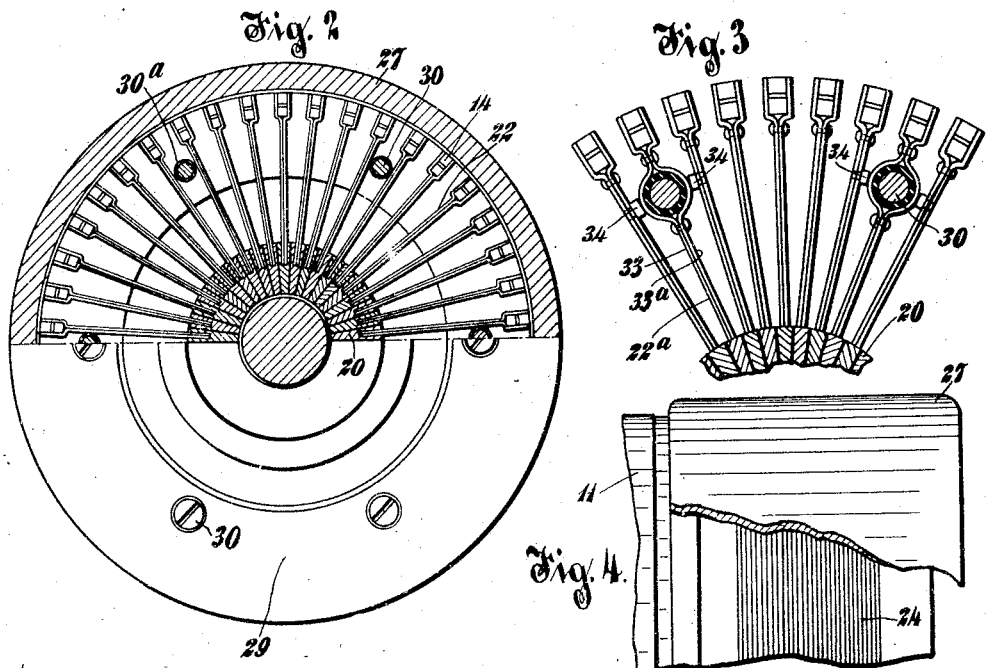
Witnesses
Inventor
Alfred H. Wouters
By
Chas. E. Lord
Attorney

UNITED STATES PATENT OFFICE.

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

TURBO-GENERATOR.

No. 894,305.        Specification of Letters Patent.        Patented July 28, 1908.

Application filed November 3, 1906. Serial No. 341,815.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Turbo-Generators, of which the following is a full, clear, and exact specification.

My invention relates to dynamo-electric machines and particularly to high speed machines of the direct current type, such as direct current turbo-generators.

In high speed machines it is necessary to provide means for holding in position the portions of the coils which project beyond the ends of core so that the coils can not be displaced by centrifugal action. It has been proposed to surround the projecting portions of the coils by heavy rings or bands. When rings are employed for this purpose, it is necessary to provide some means for supporting and centering the rings and for preventing movement thereof axially of the machine.

In direct current machines, considerable difficulty has been experienced in providing adequate supporting and protecting means for the coils at the commutator end of the armature, for the reason that the commutator necks or leads connecting the coils to the commutator bars, render difficult proper supporting of coil retaining rings. Accordingly band wires have usually been relied upon for retaining the projecting portions of the coils in position. This latter expedient is not satisfactory for all types of machines, particularly for high speed machines of large kilowatt capacity, for the reason that at high peripheral speeds the band wires are in great danger of breaking or becoming loose and wrecking the machine.

The object of my invention is to provide suitable and reliable means for fastening in position the portions of the coils which project beyond the ends of the core, particularly at the commutator end of the core.

In carrying out my invention, I surround the projecting portions of the coils at the commutator end of the machine by a ring and secure the latter in position by screws or bolts.

My invention in another aspect consists in surrounding the projecting portions of the coils, first by tightly wound band-wire, and then by a heavy rigid ring, the band-wire forming a good bearing surface for the ring.

More specifically considered, my invention consists in an armature of a dynamo-electric machine having a core and coils which project beyond the ends thereof, the projecting portions of the coils being tightly wrapped with band wire and inclosed within a heavy rigid ring, which fits tightly over the band wire, the ring being centered and held in position by the band wire and also by screws or bolts which preferably pass between the commutator necks into a bracket or shoulder upon which the coils rest.

My invention still further consists in certain novel details of construction and combinations and arrangements of parts described in the specification and set forth in the appended claims.

For a better understanding of my invention, reference is had to the accompanying drawings forming a part of this application in which Figure 1 is a partial sectional elevation of a high speed armature equipped with my invention; Fig. 2 is a partial end elevation, and a partial sectional elevation on the line 2—2 of Fig. 1; Fig. 3 is a sectional elevation of a portion of the machine showing a slightly modified arrangement of the ring retaining and supporting screws or bolts relative to the commutator leads; and Fig. 4 is a partial view of the end of the armature, a portion of the coil retaining ring being broken away, showing the location of the band wire.

Referring now to the figures of the drawing, 10 represents a shaft on which a core 11 and commutator 12 are mounted. The core consists of laminæ held between end members, one of which is shown at 13. The armature is provided with a winding having portions 14 which project beyond the core and rest upon a shoulder or bracket 15 extending outwardly from the end member 13. The end member 13 is also provided with a slotted flange 16 through which the coils of the winding pass and with an inwardly extending flange 17 in the outer end of the bracket 15. The shaft 13 in this case is provided with slots or flutes 18 which communicate with the air ducts 19 of the core.

The bars 20 of the commutator 12 are held in position on the shaft by a plurality of shrink-rings 21, two of which are shown. The commutator bars are connected to the ends 14 of the coils which project a short distance beyond the flange 17, by radial commutator leads or necks 22 extending along the outer surface of the flange 17 a short distance therefrom. These leads or necks are preferably riveted to the bars and soldered to the ends of the coils.

The projecting portions 14 of the coils are bound to the bracket 15 by tightly wound band-wire 24, the strands being arranged closely together in a continuous layer covering the entire projecting portions of the coils except the outer ends and the portions adjacent the flange 16. After the band-wire is wound over the coils, the armature is preferably placed in a lathe and the band-wire is turned down forming a true cylindrical outer surface. The projecting portions or ends 14 of the coils are separated from the bracket 15 by insulation 25 and from the band-wire 24 by insulation 26.

Inclosing the coils and the band-wire and fitting tightly over the latter is a protecting end-ring 27 consisting of a cylindrical portion 28 having a flange 29 at right angles to the cylindrical portion and extending inward over the commutator leads. The ring 27 rests not only on the band-wire but also on the slotted flange 16 of the end-member. It is seen that the band-wire forms a good solid bearing surface for the ring, thus assisting in centering and supporting the latter, in addition to assisting in resisting the stresses due to centrifugal action. In some cases the end-ring may be supported by this means alone. I have also shown additional means for supporting and retaining the ring in position consisting of axial bolts or screws 30 passing through the inwardly extending flange 29 of the end-ring 27 into the flange 17 of the bracket 15, the flange 29 of the end-ring being recessed to receive the ends of the screws or bolts 30. In Fig. 2 these bolts are shown as passing between pairs of adjacent leads, being separated therefrom by coverings of insulation 30ᵃ. In case the commutator necks are arranged very closely together it may be necessary to spread apart the adjacent necks or leads between which the bolts pass. The commutator leads or necks in this case are separated from the flange 17 of the bracket by insulation 31, and from the inwardly extending flange 29 of the end-ring by insulation 32. When the screws or bolts are tightened, the projecting portions 14 of the coils and the commutator necks are held firmly in position and can not possibly be moved or disturbed at high speeds.

In Fig. 3 I have shown a slight modification of the arrangement of the bolts 30 and of the commutator leads. In this case each bolt passes between the two straps or conductors 33 or 33ᵃ composing a commutator lead 22ᵃ, special leads being provided so that they may be spread apart to receive the bolts. As here shown the straps or conductors through which the bolts pass are riveted together above and below each bolt. The leads or necks through which the bolts pass are shown as spaced from the adjacent necks by insulating spacing members 34.

It is apparent that I have a very rigid and compact structure, and one that consists of few parts, which are easily constructed and assembled. It is also apparent that the coils and commutator necks are so held in position that there can be no movement thereof nor can they be injured in any manner.

It is evident that my invention is susceptible of changes or modifications without departing from its spirit and scope, and I aim in my claims to cover all such changes and modifications.

What I claim as new and desire to secure by Letters Patent is:—

1. In an armature of a dynamo-electric machine, a core and end member, coils carried by said core, portions of said coils projecting beyond the core and resting on the end member, a commutator, commutator leads or necks connecting the coils and bars of the commutator, said commutator leads or necks extending inward over the end of said end-member, a ring surrounding the projecting portions of the coils, and means comprising bolts or screws for fastening the ring to said end-member.

2. In an armature of a dynamo-electric machine, a core and end-member or bracket, coils carried by said core, portions of said coils projecting beyond the core and resting on said end-member or bracket, a commutator, commutator leads secured to said coils and commutator, an end-ring surrounding the projecting portions of the coils, and bolts or screws passing between the commutator leads and insulated therefrom for fastening the end-ring to the end-member or bracket.

3. In an armature of a dynamo-electric machine, a core, coils carried thereby, a bracket for supporting portions of the coils projecting beyond the core, said bracket having an inwardly extending flange at its outer end, an end-ring surrounding the coils and having an integral flange extending inwardly parallel to the flange on the bracket but spaced therefrom, a commutator, commutator necks or leads extending inwardly between said flanges and connecting the coils and commutator, and means for securing the end-ring in position against axial movement.

4. In an armature of a dynamo-electric machine, a core, coils carried thereby, a bracket for supporting portions of the coils projecting beyond the core, said bracket having an inwardly extending flange at its outer end, an end-ring surrounding the coils and having a flange extending inwardly parallel to the flange on the bracket but spaced therefrom, commutator necks or leads extending inwardly between said flanges and insulated therefrom, and means for securing said ring against axial movement comprising axial bolts or screws passing through the flange of the ring between the commutator necks or leads and into the bracket.

5. In an armature of a dynamo-electric machine, a core, coils carried thereby, an end member or bracket supporting the ends of the coils, means for retaining the ends of the coils in position comprising a wrapping or covering of band-wire presenting a smooth cylindrical exterior surface, a rigid ring surrounding said band-wire in engagement therewith and centered thereby, and means for securing the ring to the end member to prevent axial movement of said ring.

6. In an armature of a dynamo-electric machine, a core, coils carried thereby, a bracket supporting the ends of the coils, a commutator, radial commutator necks or leads extending inwardly from said coils to the commutator, means for holding the ends of the coils on said bracket, comprising a covering of tightly wrapped band-wire, and a ring surrounding said band-wire in engagement therewith and centered thereby, said ring being provided with an integral annular flange extending inwardly toward the commutator over and protecting the commutator leads, and means for retaining said ring in position comprising bolts passing through said flange between said commutator necks and into said bracket.

In testimony whereof I affix my signature, in the presence of two witnesses.

ALFRED H. WOUTERS.

Witnesses:
ARTHUR F. KWIS,
GEO. B. SCHLEY.